US012021978B2

(12) United States Patent
Manuel-Devadoss

(10) Patent No.: US 12,021,978 B2
(45) Date of Patent: Jun. 25, 2024

(54) BLOCKCHAIN RECORD OF USER BIOMETRICS FOR ACCESS CONTROL

(71) Applicant: ORACLE INTERNATIONAL CORPORATION, Redwood Shores, CA (US)

(72) Inventor: Johnson Manuel-Devadoss, San Antonio, TX (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 17/382,720

(22) Filed: Jul. 22, 2021

(65) Prior Publication Data

US 2023/0029053 A1   Jan. 26, 2023

(51) Int. Cl.
 *H04L 9/08* (2006.01)
 *H04L 9/06* (2006.01)
 *H04L 9/32* (2006.01)

(52) U.S. Cl.
 CPC .......... *H04L 9/0866* (2013.01); *H04L 9/0631* (2013.01); *H04L 9/0825* (2013.01); *H04L 9/3249* (2013.01)

(58) Field of Classification Search
 CPC ... H04L 9/0866; H04L 9/0631; H04L 9/0825; H04L 9/3249
 See application file for complete search history.

(56) References Cited

U.S. PATENT DOCUMENTS

| 6,731,731 | B1* | 5/2004 | Ueshima | G06F 21/31 |
| | | | | 726/5 |
| 10,693,872 | B1* | 6/2020 | Larson | H04L 9/3231 |
| 2015/0222622 | A1* | 8/2015 | Lowe | H04L 63/062 |
| | | | | 726/6 |
| 2016/0342784 | A1 | 11/2016 | Beveridge et al. | |
| 2018/0167394 | A1* | 6/2018 | High | H04L 63/10 |
| 2018/0276450 | A1* | 9/2018 | Rakshit | G06F 21/32 |
| 2019/0312731 | A1* | 10/2019 | Eldefrawy | H04L 9/085 |

(Continued)

OTHER PUBLICATIONS

Jang et al.; Biometric-PKI Authentication System Using Fingerprint Minutiae; Journal of Computer and Communications, 2014, 2, 25-30; pp. 1-6; Published Online Mar. 2014 in SciRes. http://www.scirp.org/journal/icchttp://dx.doi.org/10.4236/jcc.2014.24004.

(Continued)

*Primary Examiner* — Phy Anh T Vu
(74) *Attorney, Agent, or Firm* — Kraguljac Law Group, LLC

(57) ABSTRACT

Systems, methods, and other embodiments for decentralized identity with user biometrics are presented herein. In one embodiment, a method includes, in response to a request to access resources of a cloud service provider by a computing device, transmitting a request for a biometric private key to a mobile device associated with a user; in response to receiving the biometric private key, submitting the biometric private key for validation against a blockchain associated with the user and the mobile device; adding a record of the results of the validation to the blockchain; and controlling access to the resources of the cloud service provider based on the record in the blockchain by (i) denying access where the record indicates that validation has failed (ii) granting access where the record indicates that validation has succeeded.

19 Claims, 5 Drawing Sheets

(56) References Cited

U.S. PATENT DOCUMENTS

| | | | |
|---|---|---|---|
| 2019/0312863 A1* | 10/2019 | Chow | H04L 9/3247 |
| 2019/0370479 A1* | 12/2019 | Uhr | H04L 67/55 |
| 2020/0007333 A1 | 1/2020 | Young et al. | |
| 2020/0067907 A1* | 2/2020 | Avetisov | H04L 9/3239 |
| 2020/0145219 A1 | 5/2020 | Sebastian et al. | |
| 2020/0334685 A1* | 10/2020 | Yan | G06Q 20/4016 |
| 2020/0412541 A1* | 12/2020 | Yang | H04L 9/3239 |
| 2021/0152365 A1* | 5/2021 | Nosseir | H04L 9/3239 |
| 2021/0295320 A1* | 9/2021 | Yan | G06Q 20/40 |
| 2021/0326432 A1* | 10/2021 | Kaidi | H04L 9/3226 |
| 2021/0350010 A1* | 11/2021 | Schvey | G06Q 20/223 |
| 2022/0156387 A1 | 5/2022 | Keller et al. | |
| 2022/0237274 A1 | 7/2022 | Paul et al. | |
| 2022/0253516 A1* | 8/2022 | Chung | H04L 9/3231 |

OTHER PUBLICATIONS

Temoshok et al.; Developing Trust Frameworks to Support Identity Federations; National Institute of Standards and Technology—U.S. Dept. of Commerce (NISTIR 8149) Jan. 2018; pp. 1-34; available at: https://doi.org/10.6028/NIST.IR.8149.

Corestreet, Ltd.; Introduction to Validation for Federated PKI; pp. 1-21; Copyright 2006; downloaded from: https://corestreet.com/about/library/whitepapers/w06-03v2a%20-%20federated-pki.pdf.

Patent Cooperation Treaty (PCT) International Search Report and Written Opinion issued in PCT International Application No. PCT/US2022/031721, dated Sep. 8, 2022 (16 pgs).

Non-Final Office Action from co-pending U.S. Appl. No. 17/730,447, filing date of Apr. 27, 2022, dated Feb. 8, 2024; 17 pgs.

\* cited by examiner

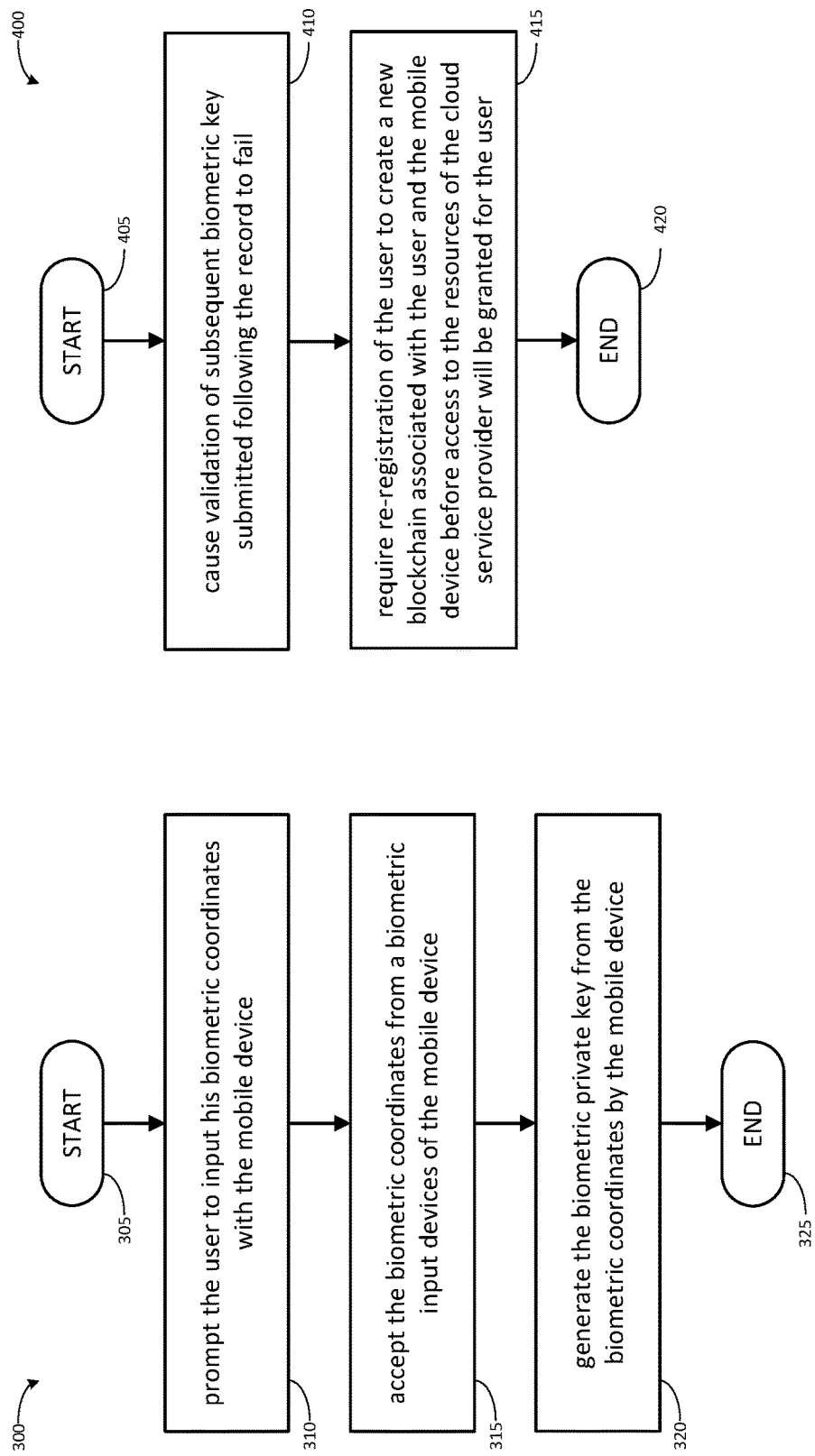

BLOCKCHAIN RECORD OF USER BIOMETRICS FOR ACCESS CONTROL

BACKGROUND

Multi-Factor Authentication (MFA) is an authentication method wherein a user is granted access to a secured computing system or application only after presenting two or more "factors" to an authenticator. The factors are items of evidence that confirms the identity of the user, such as knowledge factors— something only the user knows, possession factors—something only the user has, or inherence factors—something that only the user is, location factors— somewhere that only the user is, or other factors associated uniquely with the user. One form of possession factor is a token device which generates a one-time password or passcode from a seed known only to the authenticator. This password may be a private key. The token device may be either a disconnected token device, which presents the one-time password to the user (for example on a display such as an LCD or LED seven-segment array) for subsequent provision to the secured computing system as an authentication factor; or (ii) a connected token device which presents the one-time password directly to the computing system being used by the user to access the secured computing system (for example through a USB or wireless interface) for subsequent provision to the secured computing system as an authentication factor. One significant disadvantage of token devices is that they may not always be carried by the user when the user needs to access the secured computing system. Worse, a token device may be damaged or otherwise fail, leaving the user without access to the secured computing system. Also, a token device may be stolen from the user, potentially enabling a malicious user to gain access to the secured computing system. Further, systems which generate the password to validate the user identity before the user attempts to access the secured computing system reduces security by providing an opportunity between password generation and access attempt for a malicious user to intercept and use the password.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 3 illustrates one embodiment of a method for biometric private key generation associated with provision of decentralized identity with user biometrics.

FIG. 4 illustrates one embodiment of a method for enforcing re-registration of a compromised user identity associated with provision of decentralized identity with user biometrics.

DETAILED DESCRIPTION

Figure 1:
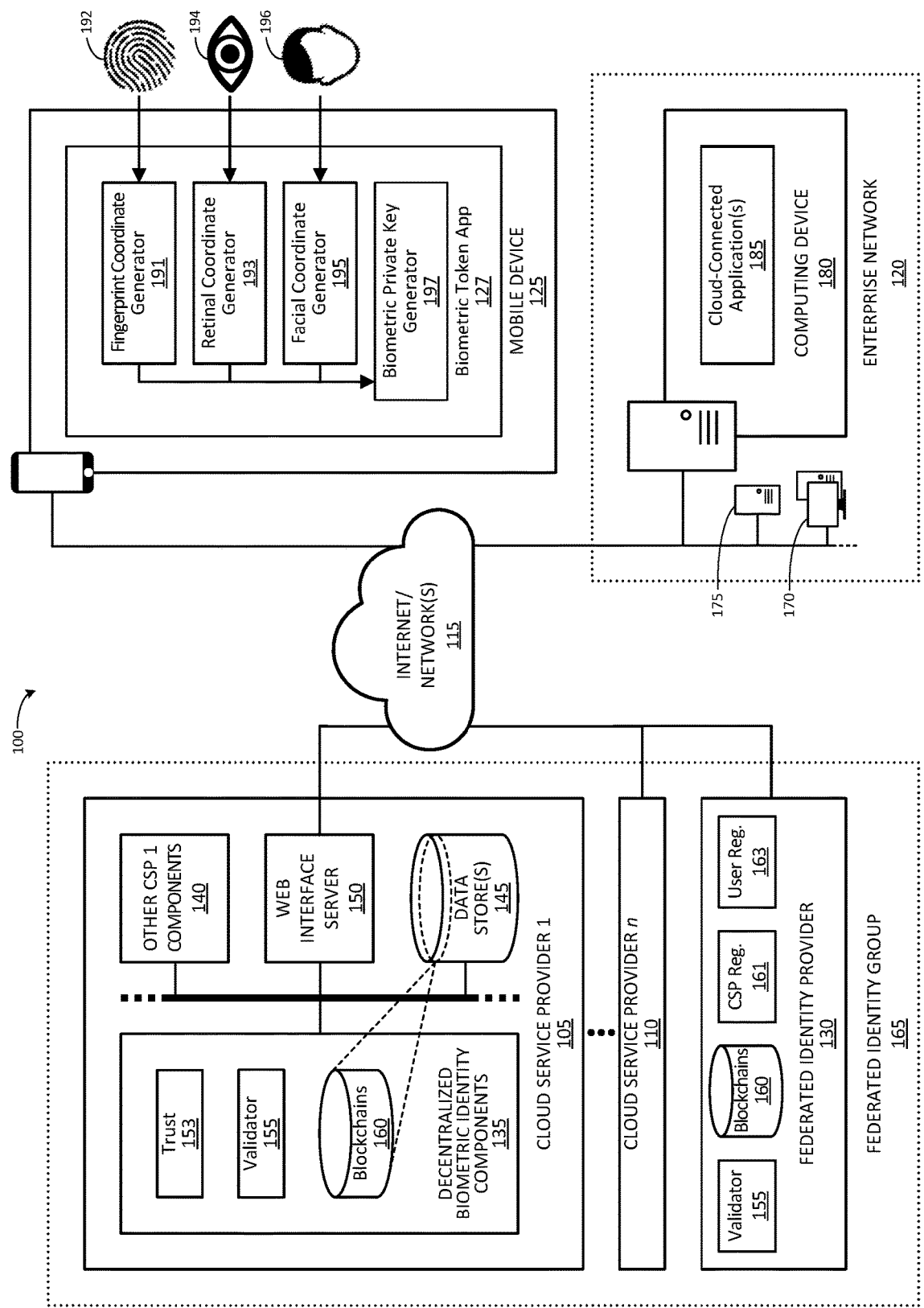
FIG. 1 illustrates one embodiment of a computing system associated with provision of decentralized identity with user biometrics.

Systems and methods are described herein that provide a decentralized identity with user biometrics. In one embodiment, the systems and methods for decentralized identity with user biometrics overcomes the disadvantages of possession factor password generation described above by forming a federated trust platform which generates the password—a private key—using the user's biometric coordinates, such as fingerprint, facial, or retinal scan coordinates. The systems and methods described herein fulfill the need for a decentralized identity provider between cloud providers to provide multi-factor authentication using human biometrics.

In one embodiment, the federated trust platform is used to access secured computing systems such as cloud systems, establishing tighter integration between cloud providers through the federated trust relationship. In one embodiment, a user computing device equipped with input devices capable of observing a user's biometric features (for example, camera, dedicated fingerprint scanner, dedicated retinal scanner, camera configured to take retinal images, or other sensing device, altogether referred to herein as biometric input devices) is configured by software to function as a possession factor token device that generates a private key based on the user's biometric coordinates.

In one embodiment, the systems and methods described herein include an application such as a mobile application that may be offered by an app store and downloadable to a user computing device such as a mobile device equipped with biometric input devices. When installed, the mobile application configures the user computing device to function as a token device as described herein. A user is added to the system in an initial registration operation using the application. The system requests the user to provide their thumbprint, fingerprint, or eye retinal scan coordinates using the application. The user opens the application and registers his or her identity by placing his or her thumb or finger on the fingerprint scanner or placing his or her eye in front of a retinal scanner or camera, such as a mobile device camera. The app reads user finger print or eye retinal co-ordinates to generate the private key.

Following registration, when user attempts to access a secured computing system, such as a cloud platform or cloud service provider, the secured computing system redirects the user request to a server of a federated trust platform, which is configured in accordance with the systems and methods described herein. The federated trust platform prompts user to place their eye in front of the camera or scan their fingerprints using the application to validate against their private key. Once the private key has been validated then the federated trust platform directs his/her request to the cloud provider to allow the request.

A blockchain is a growing list of records, or blocks, that are cryptographically linked. The blocks commonly include a transaction data, a time stamp, and a cryptographic hash of the prior block in the chain that confirms the integrity of the prior block. Blockchains can be used to implement a shared digital ledger for recording user transactions between multiple cloud providers. When a user transaction is executed and validated, it is appended to the end of the blockchain, making the blockchain an immutable history of all valid transactions.

In one embodiment, the systems and methods described herein create a blockchain network between cloud providers and the federated trust platform described herein. In one embodiment, the federated trust platform described herein acts as a master and multiple cloud providers act as slaves in a distributed Certifying Authority (CA). Each slave cloud provider is added as a peer in the blockchain network. Each slave cloud provider retrieves a root of trust certificate from a master and stores it in the cloud provider's keystore. The slaves—various cloud providers—only need root of trust certificates from the master—the federated trust platform described herein—and the master requires root of trust certs and address from each slave cloud provider to establish the tighter trust relationship in a business network. The master federated trust platform loads the network configuration and policy files and shares the policy to slave cloud providers to accept to load the partial identity block into the blockchain. When distributed CA starts, it distributes the private key to be stored in each cloud providers keystore systems. In one embodiment, the private key is distributed as shards—portions of the private key, a certain number of which may be used to reconstruct the private key. For example, in the Amazon Web Services (AWS) cloud provider the Key Management Service (KMS) keystore would be used to store the private key. Or, in another example, in the Microsoft Azure cloud provider the Keyvault keystore would be used to store the private key. In yet another example, in the Oracle Cloud Infrastructure (OCI) a Java keystore (JKS) would be used to store the private key. The master federated trust platform then wraps a CA public key as a Certificate Signing Request (CSR) and adds the wrapped key to partial identity block, forming an initial block or genesis block of a blockchain. The master federated trust platform then provisions the intermediate certificate authority (ICA) for each cloud provider. Each cloud provider generates an ICA key pair where ICA private keys are stored on a cloud provider node keystore and public keys are wrapped as CSR and shared with the master federated trust platform "out of band," or over a network (or network channel) separate from the primary network (or network channel). The master federated trust platform then provisions the identity user account for each cloud provider and generates biometric identity keys using the mobile application. A public key wrapped as CSR is shared with a master (such as the federated trust platform) out of band. The master invokes a system smart contract (also known as a self-executing contract, in which the terms of an agreement are written as code that executes when conditions of the agreement are fulfilled) to enroll each of the cloud provider ICA CSRs, reconstructing and outputting a certificate.

The master invokes the system contract additional times to enroll each of the Admin CSRs, outputting a certificate. The master adds certificates to partial identity block. Each identity user in each cloud provider creates a public/private key pair for their cloud peer node. Thus, a private key is added to a node keystore, a public key is wrapped as a CSR, and each identity user invokes a system smart contract for adding a peer node. A function invocation is signed by the ICA of an invoking cloud provider with the user identity key (from, for example, a mobile app) to form a peer certificate. The invoking cloud provider sends the peer certificate to the master federated trust provider to insert into an identity block of the blockchain. The identity block is finalized a sent to the slaves. The blockchain network for this user identity (combination of user and mobile device) is now active.

In some scenarios, an individual blockchain system may be deployed into each cloud provider to provide the identity solutions (for example as shown and described with reference to decentralized (and blockchain-based) biometric identity components 125 of FIG. 1). Each blockchain system may create business network archive (blockchain network) between cloud provider, enterprise, and enterprise identity provider. In another embodiment, multi-cloud identity may be provided by an interoperable blockchain architecture combining distinguishable blockchain systems in each of the cloud providers. In such an interoperable blockchain architecture, each blockchain system represents a distributed data ledger, where cloud identity transaction execution may span more than one of the combined blockchain systems, and where data recorded in one blockchain is reachable and verifiable by another possibly foreign transaction in a semantically compatible manner.

In other embodiment, a mobile application that works with the blockchain system may be offered for download. For example, a user of the blockchain system would download the mobile application from an app store. While registering the user into the system, the present invention requests the user to provider his/her biometric information such as fingerprint(s), facial, or eye retinal scan co-ordinates using mobile app. User opens the app and register his/her identity by placing his/her finger on the screen or by showing their face or eye in front of mobile device camera vicinity. The app reads user finger print or eye retinal co-ordinates to generate the private key and register with blockchain platform with private key. When user access the cloud platform, cloud platform redirects the user request to blockchain platform to validate the user identity, user opens the mobile app to provide their fingerprint, face, or retinal scan coordinates to authenticate with the blockchain platform. In response to a prompt by the mobile application, presents his or her fingerprint, face, retina, or other biometric identifier to the mobile device for validation against the user's private key stored by the blockchain platform. Where the biometric identifier is a fingerprint, the user places his or her finger prints on a fingerprint reader to read the finger print for validation. Where the biometric identifier is a face, the user places his or her face in front of a camera to record the face for validation. Where the biometric identifier is a retina, the user places his or her eye in front of (and close to) the camera to record the retina for validation. The blockchain platform compares the user identity by validating his/her finger print or retinal scan and generated private key based on his/her finger print or retinal scan. Once the private key has been validated then the blockchain platform directs his/her request to the cloud provider to allow.

No action or function described or claimed herein is performed by the human mind. An interpretation that any action or function can be performed in the human mind is inconsistent with and contrary to this disclosure.

Example Environment

FIG. 1 illustrates one embodiment of a computing system 100 associated with provision of decentralized identity with user biometrics.

In one embodiment, system 100 includes multiple cloud service providers, such as cloud service provider 1 105 through cloud service provider n 110, connected by networks 115 (such as the Internet or another suitable communications network or combination of networks) to an enterprise network 120 and a mobile device 125 configured as a biometric token device. Optionally, a dedicated federated identity provider 130 may also be connected to cloud service providers 105, 110, enterprise network 120, and mobile device 125 through networks 115. In one embodiment, cloud service providers 105, 110, may be Oracle® Cloud Infrastructure (OCI), Amazon Web Services (AWS), Microsoft Azure, Google Cloud, Alibaba Cloud, IBM Cloud, Salesforce, SAP, Rackspace Cloud, VMWare, or other cloud computing system configured to execute the methods for provision of decentralized user identity with user biometrics as shown and described herein. Cloud computing systems such as those listed above may each be improved by being configured to join the decentralized identity with user biometrics system in order to offer the distributed federated identity with multi-factor authentication based on user biometrics enabled by the systems and methods described herein. This allows different cloud providers to share a common federated identity service based on user biometrics. In one embodiment, cloud service providers 105, 110 include various systems and components which include decentralized biometric identity components 135, other cloud service components 140, data store(s) 145, and web interface server 150.

In one embodiment, decentralized biometric identity components 135 (and optional dedicated federated identity provider 130) include one or more components configured for implementing methods, functions, and features described herein associated with provision of decentralized identity with user biometrics. Decentralized biometric identity components 135 may include trust components 153 configured to generate, communicate, and evaluate trust information for enrolling a cloud provider as a blockchain peer, validator 155 configured to parse, examine, and approve or deny inclusion in blockchain 160 of a biometric key associated with a request to access resources of a cloud service provider, in accordance with the systems and methods described herein. Trust components 153 may include an intermediate certificate authority (ICA). Blockchains 160 may be stored as data structures data stores 145.

Blockchains 160 are a form of distributed digital ledger made up of record data structures called blocks. In a blockchain, each block is linked in turn to the immediately prior block of the blockchain by a cryptographic hash of the immediately prior block back to an initial or "genesis" block. Blocks may be automatically added to a blockchain by a validator (such as validator 155) when successfully "validated," or confirmed to satisfy the rules of a smart contract governing inclusion of the block in the blockchain. The validation rules vary depending on the application of the blockchain. The blockchain is tamper-evident, because a block in the blockchain cannot be modified retroactively without also modifying all subsequent blocks in the blockchain. Blockchains may be public, with no access restrictions on participation or validation; or private, with participation and validation restricted to those entities having appropriate permissions. Blockchains are maintained by participating peer computing systems connected through a network, with a copy of the blockchain stored by each peer.

In one embodiment, each of cloud service provider 1 105 through cloud service provider n 110 and dedicated federated identity provider 130 are members of a federated identity group 165. Each of cloud service provider 1 105 through cloud service provider n 110 and dedicated federated identity provider 130 are configured by decentralized biometric identity components 135 to operate as blockchain peers in accordance with the systems and methods described herein. In one embodiment, each individual blockchain in blockchains 160 are configured to represent cloud computing service authorization activity for a particular 2-factor user-mobile device combination, as shown and described herein. For example, the genesis block in a blockchain is configured to represent an authorization subject to presentation of a proper biometric private key, and the subsequent blocks in the blockchain are configured to represent access requests and the success or failure of validation of a biometric private key presented with the access request. Validator 155 is configured to include and execute smart contract rules for determining whether a biometric private key presented with an access request is valid, and to add a block to the blockchain indicating the validity or invalidity of the presented private key, as shown and described herein.

In one embodiment, federated identity provider 130 is configured to unite multiple cloud service providers into a federated identity group 165 that uses blockchain to manage identity in a decentralized manner. In one embodiment, federated identity provider 130 is a standalone system apart from the cloud service providers in the federated identity group 165. In one embodiment, federated identity provider 130 is a part of one of the cloud service providers in the federated identity group 165. As shown and described herein, federated identity provider may include validator 155 and blockchains 160, as well as cloud service provider registration components 161 configured to register cloud service providers as peers in the federated identity group and user registration components 163 configured to register user identities for access to the cloud service providers. In one embodiment, because federated identity group 165 implements a private or permissioned blockchain, federated identity provider 130 governs the initial registration of blockchain peers (the cloud service providers) and the initial registration of user identities. After registration, the peers maintain the blockchains of the access transactions for each user identity.

In one embodiment, a biometric token application 127 is installed on mobile device 125. Biometric token application 127 configures mobile device 125 to operate as a multifactor authentication possession factor of the user: a token device that generates a private key unique to the user based on biometric input from the user. In one embodiment, biometric token application 127 includes fingerprint coordinate generator 191 configured to accept scanned fingerprint(s) 192 from fingerprint scanning hardware of mobile device 125 and convert them to mathematical coordinates describing the scanned fingerprint(s) 192. In one embodiment, biometric token application 127 retinal coordinate generator 193 configured to accept image(s) of retina(s) 194 from a camera or dedicated retinal scanner of mobile device 125 and convert them to mathematical coordinates describing the imaged retina(s) 194. In one embodiment, biometric token application 127 includes facial coordinate generator 195 configured to accept image(s) of face(s) 196 from a camera of mobile device 125 and convert them to mathematical coordinates describing the scanned face(s) 196. In one embodiment, mobile device 125 has only one of fingerprint coordinate generator 191, retinal coordinate generator 193, and facial coordinate generator 195. In one embodiment, mobile device has more than one of fingerprint coordinate generator 191, retinal coordinate generator 193, and facial coordinate generator 195. In one embodiment, biometric token application 127 includes biometric private key generator 197 configured to retrieve biometric coordinates generated by at least one of fingerprint coordinate generator 191, retinal coordinate generator 193, and facial coordinate generator 195 and convert the coordinates to a private key token. Biometric token application 127 may cause mobile device 125 to transmit the generated biometric private key through networks 115 to validator(s) 155 or user registration components 163, for example in response to a request for the private key received by mobile deice 125.

Each of the components of cloud service provider 1 105 through cloud service provider n 110, dedicated federated identity provider 130, mobile device 125, and computing device 180 is configured by logic to execute the functions that the component is described as performing. In one embodiment, the components may each be implemented as sets of one or more software modules executed by one or more computing devices specially configured for such execution. In one embodiment, the components of cloud service provider 1 105 through cloud service provider n 110 and dedicated federated identity provider 130 are implemented on one or more hardware computing devices or hosts interconnected by a data network. For example, the components of cloud service provider 1 105 through cloud service provider n 110 and dedicated federated identity provider 130 may be executed by network-connected computing devices of one or more compute hardware shapes, such as central processing unit (CPU) or general purpose shapes, dense input/output (I/O) shapes, graphics processing unit (GPU) shapes, and high-performance computing (HPC) shapes. In one embodiment, the components of cloud service provider 1 105 through cloud service provider n 110 and dedicated federated identity provider 130 are each implemented by one or more dedicated computing devices. In one embodiment, several or all components of each of cloud service provider 1 105 through cloud service provider n 110 and dedicated federated identity provider 130 are implemented by a common (or shared) computing device, even though represented as discrete units in FIG. 1. In one embodiment, components of cloud service provider 1 105 through cloud service provider n 110 and dedicated federated identity provider 130 may be implemented across multiple computing devices. In one embodiment, each of cloud service provider 1 105 through cloud service provider n 110 and dedicated federated identity provider 130 may be implemented as services on cloud infrastructure. In one embodiment cloud service provider 1 105 through cloud service provider n 110 and dedicated federated identity provider 130 may each be hosted by a dedicated third party, for example in an infrastructure-as-a-service (IAAS), platform-as-a-service (PAAS), or software-as-a-service (SAAS) architecture.

In one embodiment, the components of computing system 100 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. computing system 100 may (i) generate or compose an electronic message or signal to issue a command or request to another component, (ii) transmit the message or signal to other components of computing system 100, and (iii) parse the content of an electronic message or signal received to identify commands or requests that the component can perform, and in response to identifying the command, the component will automatically perform or execute the command or request.

API calls may include queries against databases. The queries may be composed and executed in query languages compatible with the database and executed in a runtime environment compatible with the query language.

In one embodiment, data store 145 is a computing stack for the structured storage and retrieval of one or more collections of information or data in non-transitory computer-readable media, for example as one or more data structures. In one embodiment, data store 145 includes one or more databases, including blockchains 160 database configured to store and serve blockchain data, or other databases configured to store and serve other information used by cloud service providers. In one embodiment, the blockchains 160 are maintained in the keystore of each cloud service provider 105-110. A keystore, such as a JKS, KMS keystore, or Keyvault keystore, is a repository of security certificates for a cloud service provider. In one embodiment, the blockchains 160 of access attempts may be stored, updated from time to time, or otherwise maintained, in a keystore of the cloud service provider. In one embodiment, the databases used herein are Oracle® databases. In some example configurations, data store(s) 160 may be implemented using one or more Oracle® Exadata compute shapes, network-attached storage (NAS) devices and/or other dedicated server device.

Enterprise network 115 may be associated with a business or other enterprise. For simplicity and clarity of explanation, enterprise network 115 is represented by one or more operably interconnected personal computers 145 or servers 150 (such as computing device 180). Each personal computer 145 is generally dedicated to a particular end user, such as an employee or contractor associated with the business, although such dedication is not required. The personal computers 145 and remote may be, for example, a desktop computer, laptop computer, tablet computer, mobile device (such as a smart phone, tablet computer, mobile phone, or other handheld portable computing device), or other device having the ability to connect to enterprise network 120 or networks 115 through wired or wireless connections.

Computing devices in enterprise network 120 (such as computing device 180) may include a cloud connected application(s) 185 that makes use of more than one cloud service provider in federated identity group 165. Cloud connected application 185 may interface with cloud service provider 1 105 through cloud service provider n 110 across the Internet 115 (or another suitable communications network or combination of networks). In one embodiment, remote computing systems (such as those of enterprise network 115) may access information or applications provided by cloud service provider 1 105 through cloud service provider n 110 and dedicated federated identity provider 130 through a web interface, such as web interface server 150. In one embodiment, the remote computing system may send requests to and receive responses from web interface server 150. In one example, access to the information or applications may be effected through use of a web browser on executing on computing device 180, or other computers of enterprise network 120. The web browser may be configured to display a graphical user interface for requesting access to cloud services for the cloud-connected application(s) 185, and displaying instructions for using mobile device 125 to generate a biometric private key in connection with the access request, as shown and described herein. In one example, communications may be exchanged between web interface server 150 and computing device 180, and may take the form of remote representational state transfer (REST) requests using JavaScript object notation (JSON) as the data interchange format for example, or simple object access protocol (SOAP) requests to and from XML servers.

Example Method for Decentralized Biometric Identity Access Control

In one embodiment, each step of computer-implemented methods described herein may be performed by a processor (such as processor 610 as shown and described with reference to FIG. 6) of one or more computing devices (i) accessing memory (such as memory 615 and/or other computing device components shown and described with reference to FIG. 6) and (ii) configured with logic to cause the system to execute the step of the method (such as decentralized biometric user identity logic 630 shown and described with reference to FIG. 6). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing for subsequent use any data calculated, determined, generated, classified, or otherwise created. References to storage or storing indicate storage as a data structure in memory or storage/disks of a computing device (such as memory 615, or storage/disks 635 of computing device 605 or remote computers 665 shown and described with reference to FIG. 6, or in data stores 145 shown and described with reference to FIG. 1).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

Figure 2:
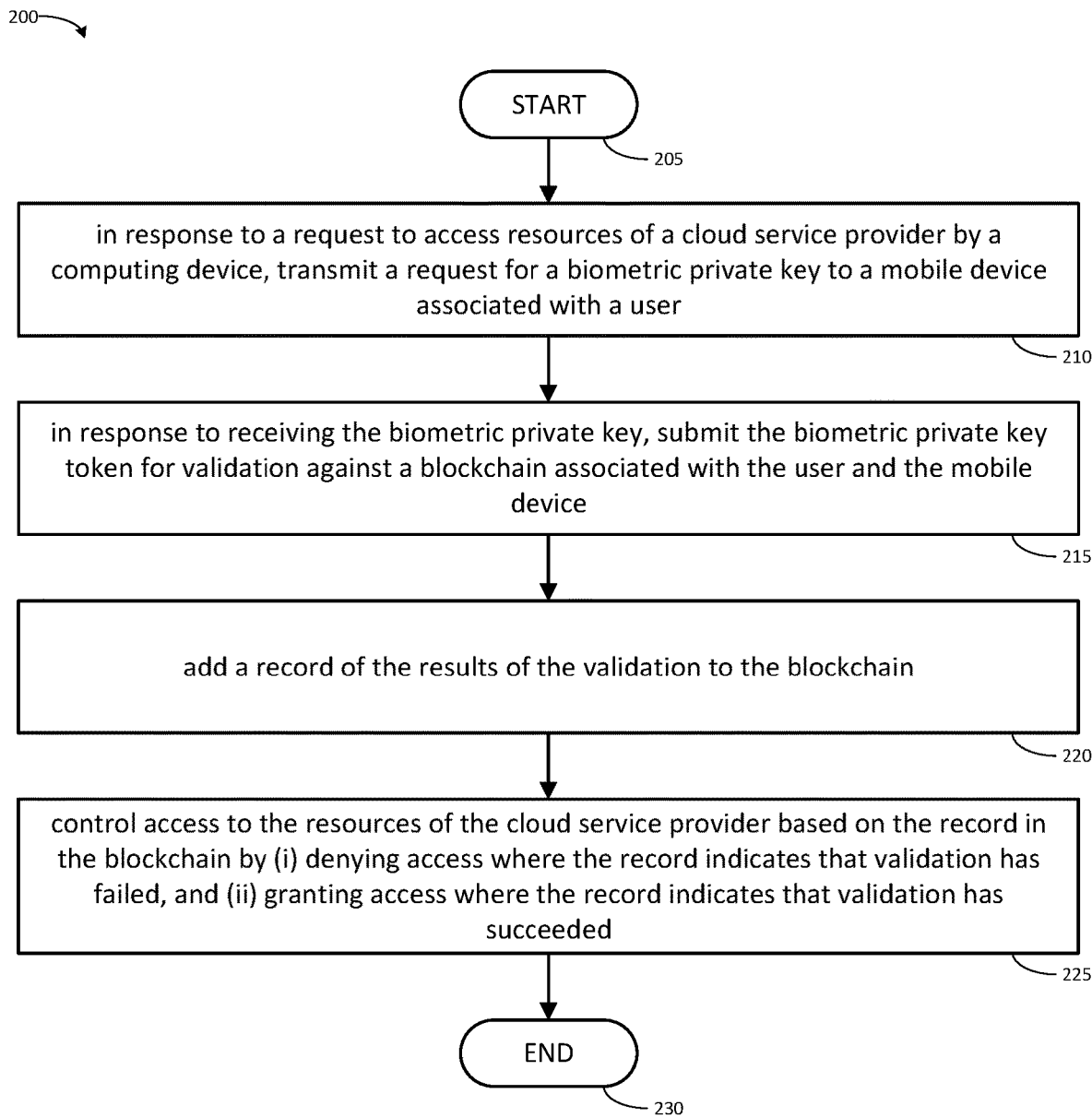
FIG. 2 illustrates one embodiment of a method associated with provision of decentralized identity with user biometrics.

FIG. 2 illustrates one embodiment of a method 200 associated with provision of decentralized identity with user biometrics. In one embodiment, the steps of method 200 are performed by decentralized biometric identity components 135 (as shown and described with reference to FIG. 1). In one embodiment, decentralized biometric identity components 135 are a special purpose computing device (such as computing device 605) configured with decentralized biometric user identity logic 630. In one embodiment, decentralized biometric identity components 135 is a module of a special purpose computing device configured with logic 630. In one embodiment, biometric multi-factor authentication across a members of a federated identity system is enabled by the steps of method 200, where such was not previously possible to be performed by computing devices. Further, the system enables the biometric multi-factor authentication across a members of a federated identity system in real time, where the biometric private key is generated only at the time of an access request, increasing security, and leaving no opportunity for a malicious party to intercept the biometric private key.

The method 200 may be initiated automatically based on various triggers, such as in response to receiving a signal over a network or parsing stored data indicating that (i) a user (or administrator) of system 100 has initiated method 200, (ii) that method 200 is scheduled to be initiated at defined times or time intervals, (iii) a user (or administrator) of system 100 has initiated a request to access resources of a cloud service provider (such as cloud service provider 105), or (iv) a request to access resources of a cloud service provider has been received from a cloud client (such as computing device 180). The method 200 initiates at START block 205 in response to parsing a signal received or stored data retrieved and determining that the signal or stored data indicates that the method 200 should begin. Processing continues to process block 210.

At process block 210, in response to a request to access resources of a cloud service provider by a computing device, the processor transmits a request for a biometric private key to a mobile device associated with a user.

In one embodiment a cloud service provider (such as cloud service provider 1 105) receives a login request associated with a user, that, if granted, will allow a computing device (such as computing device 180) associated with the user to make use of one or more computing services offered by the cloud service provider. The cloud service provider is configured by decentralized biometric identity components (such as decentralized biometric identity components 135) to require the additional authentication factor of biometric private key before the login request is approved and access is granted. The cloud service provider looks up an identifier of a mobile device associated with a user, for example by reading the identifier from a genesis block of a blockchain (such as a blockchain stored in blockchains 160) of access requests associated with the user. For example, the identifier may be a phone number, network address, media access control (MAC) address, mobile identification number (MIN), or other identifier that uniquely identifies the mobile device and enables routing of information to the mobile device. The cloud service provider generates a request for a biometric private key—a message that is configured to cause an application on the mobile device to initiate generation of a biometric private key. In one embodiment, the message includes routing information to the mobile device and an API request to the application on the mobile device. The cloud service provider then transmits the request message over networks (such as networks 115) to the mobile device to cause the mobile device to begin a process to generate the biometric private key. The cloud service provider then waits for a message from the mobile device that includes the biometric private key.

Once the processor has thus completed transmitting a request for a biometric private key to a mobile device associated with a user in response to a request to access resources of a cloud service provider by a computing device, processing at process block 210 completes, and processing continues to process block 215.

At process block 215 in response to receiving the biometric private key, the processor submits the biometric private key for validation against a blockchain associated with the user and the mobile device.

In one embodiment the cloud service provider receives a message from the mobile device and parses it to identify the biometric private key. In one embodiment, the message includes an X.509 certificate including the biometric private key. In one example, the biometric private key is used as the signature of the X.509 certificate. The cloud service provider extracts the biometric private key from the message. The cloud service provider then generates a request (such as an API request) to a validator (such as validator 155) to validate the biometric private key. The cloud service provider presents the validation request along with (or including) the biometric private key to the validator.

Once the processor has thus completed submitting the biometric private key for validation against a blockchain associated with the user and the mobile device in response to receiving the biometric private key, processing at process block 215 completes, and processing continues to process block 220.

At process block 220, the processor adds a record of the results of the validation to the blockchain.

In one embodiment the validator is configured to evaluate whether or not the biometric private key authenticates the access request by evaluation against the blockchain record of access requests associated with the user. In one embodiment, the validator includes smart contracts or automated rules for making this determination. In one embodiment, the validator retrieves an initial biometric key from the genesis block of the blockchain. The initial biometric key was generated from the user's biometric coordinates at an initial registration of the user's identity and mobile device. The validator compares the biometric private key presented to the validator against the initial biometric key to determine if they match. In one embodiment, the initial biometric key is a public key in an asymmetric-key architecture of the systems and methods described herein. In one embodiment, the initial biometric key is a private key in a symmetric-key architecture of the systems and methods described herein.

In one embodiment, where the biometric private key and the initial biometric key match, the validator will add a block (or record) to the blockchain indicating that this access request is authorized and validation has succeeded; and where the biometric where the biometric private key and the initial biometric key do not match, the validator will add a block (or record) to the blockchain indicating that this access request is not authorized and validation has failed. This records the results of the validation to the blockchain. The validator signals that it has completed the validation process.

In one embodiment, the validator also evaluates whether the blockchain indicates that a previous access request was not authorized when determining whether or not the current access request is authorized, as discussed more fully with reference to FIG. 4 and method herein. For example, where a previous access request in the blockchain was not authorized, the validator may determine all subsequent access requests added to the blockchain to be not authorized (and validation failed) due to the mobile device having potentially been compromised.

Once the processor has thus completed adding a record of the results of the validation to the blockchain, processing at process block 220 completes, and processing continues to process block 225.

At process block 225, the processor controls access to the resources of the cloud service provider based on the record in the blockchain by (i) denying access where the record indicates that validation has failed (ii) granting access where the record indicates that validation has succeeded.

In one embodiment, the cloud service provider retrieves the most recent or end block of the blockchain associated with the user presenting the access request (attempting to log in), and parses it to determine whether validation has succeeded—indicating that the access request is authorized—or failed—indicating that the access request is not authorized. Where validation has succeeded, the cloud service provider grants the access request and allows successful completion of the login attempt, enabling the computing device to access and use resources or services of the cloud service provider. Where validation has succeeded, the cloud service provider denies the access request and terminates the login attempt, preventing the computing device from accessing or making use of resources or services of the cloud service provider.

Once the processor has thus completed controlling access to the resources of the cloud service provider based on the record in the blockchain by (i) denying access where the record indicates that validation has failed (ii) granting access where the record indicates that validation has succeeded, processing at process block 225 completes, and processing continues to END block 230, where process 200 ends.

Example Federation

In one embodiment, the cloud service provider joins with other cloud service providers to share login and authentication processes offered by the federated identity provider 130, forming federated identity group 165. In the federated identity group 165, the blockchain is maintained by each of the cloud service provider and one or more other cloud service providers. This enables a single validation process to govern access to the resources of all cloud service providers in the federated identity group 165 based on the latest (most recent) record in the blockchain. Access to resources of the other cloud resource providers is controlled based on the record in the blockchain by (i) denying access to the resources of the other cloud service providers where the record indicates that validation has failed (ii) granting access to the resources of the other cloud service providers where the record indicates that validation has succeeded.

In one embodiment, the features and functions described as belonging to the federated identity provider 130 are performed by decentralized biometric identity components 135 of a cloud service provider, with no dedicated identity provider system. This is a peer-to-peer configuration of federated identity group 165, in which authentication, and in some cases, user registration, may be performed by the cloud service provider (such as cloud service provider 1 105). Here, authentication transactions are handled internally by the cloud service provider using decentralized biometric identity components 135, and validation results are propagated to the other peer cloud service providers in federated identity group 165. In this configuration, the cloud service provider acts as a peer to perform the validation of the biometric private key, add the record of the results to the blockchain maintained within the cloud service provider, and propagate the record to the other cloud service providers for inclusion in copies of the blockchain maintained by the other cloud service providers.

In one embodiment, the features and functions described as belonging to the federated identity provider 130 are implemented by a dedicated federated identity provider (as shown in FIG. 1). This is a master/slave configuration of federated identity group 165, in which registration and authentication are performed only by the federated identity provider 130. The relying cloud service providers redirect all authentication transactions to the federated identity provider 130, and rely on the validation performed by the federated identity provider 130. In this configuration, a discrete or dedicated federated identity provider separate from the cloud service providers acts as a peer to perform the validation of the biometric private key, add the record of results to the blockchain maintained within the identity provider and propagate the record to the cloud service provider and the other cloud service providers for inclusion in copies of the blockchain maintained by the cloud service provider and the other cloud service providers.

Trust components 153 maintain information about what cloud service providers and/or federated identity providers are authorized to update the local blockchain. In one embodiment, this includes a list of all the cloud service providers that are members of the federated identity group 165. Addition of new members of the federated identity group 165 is controlled by CSP registration components 161. In one embodiment, CSP 161 accepts an application to join federated identity group 165 from a new cloud service provider that is not already part of federated identity group 165, evaluates credentials provided with the application, and if the credentials satisfy the conditions for joining federated identity group 165, the new cloud service provider is admitted, and the identity of the new cloud service provider is added to the trust components 153 of all cloud service providers in federated identity group 165.

Example Method for Biometric Private Key Generation

FIG. 3 illustrates one embodiment of a method 300 for biometric private key generation associated with provision of decentralized identity with user biometrics. In one embodiment, the steps of method 300 are performed by mobile device 125 specially configured as shown and described with reference to FIG. 1. In one embodiment, mobile device 125 is a special purpose computing device (such as mobile device 500) configured with decentralized biometric user identity logic 505. In one embodiment, fingerprint coordinate generator 191, retinal coordinate generator 193, facial coordinate generator 195, and biometric private key generator 197 are module of a special purpose computing device (such as mobile device 500) configured with decentralized biometric user identity logic 505.

The method 300 may be initiated automatically based on various triggers, such as in response to receiving a signal over a network or parsing stored data indicating that (i) a user (or administrator) of system 100 has initiated method 300, (ii) that method 300 is scheduled to be initiated at defined times or time intervals, (iii) that mobile device 125 has received a request for a biometric private key of a user (or administrator) of system 100 due to a request to access resources of a cloud service provider (such as cloud service provider 105) using that user's identity, or (iv) that mobile device 125 has received a request for a biometric private key of a user (or administrator) of system 100 due to a request to register the user's identity with federated identity provider 130. The method 300 initiates at START block 305 in response to parsing a signal received or stored data retrieved and determining that the signal or stored data indicates that the method 300 should begin. Processing continues to process block 310.

At process block 310, the processor prompts the user to input his biometric coordinates with the mobile device.

In one embodiment, a biometric token application, such as biometric token application 127, is installed on a mobile device, such as mobile device 125. In one embodiment, the biometric token application is listening for requests for a biometric key of the user. In one embodiment, the biometric token application is launched in response to receiving the request. Upon receiving the request, the mobile device audibly, tactilely, and/or visually prompts the user to input his biometric coordinates. For example, the mobile device may make a sound that indicates that the request for biometric coordinates has been received as an audible prompt. For example, the mobile device may vibrate in a manner that indicates that the request for biometric coordinates has been received as a tactile prompt. For example, the mobile device may display a graphical user interface (GUI) or illuminate an indicator light as a visual prompt. In one embodiment, the GUI is a GUI of the biometric token application installed on the mobile device. In one embodiment, the GUI displays instructions indicating that a request for a biometric key of the user has been received, and instructing the user to provide his or her biometric coordinates. In one embodiment, where the biometric coordinates are fingerprint coordinates, the instructions direct the user to place their fingerprint over a fingerprint sensor of the mobile device. In one embodiment, where the biometric coordinates are retinal coordinates, the instructions direct the user to place their eye in front of a camera of the mobile device, for example in a position close to the camera to allow the camera to image the retina through the pupil of the user's eye. In one embodiment, where the biometric coordinates are facial coordinates, the instructions direct the user to place their face in front of a camera of the mobile device, for example in a position that allows the camera to image the user's face.

Once the processor has thus completed prompting the user to input his biometric coordinates with the mobile device, processing at process block 310 completes, and processing continues to process block 315.

At process block 315, the processor accepts the biometric coordinates from a biometric input devices of the mobile device In one embodiment, the biometric sensor (fingerprint scanner, retinal scanner, or camera) of the mobile device captures the user's biometric input, for example as a data image or other data structure. The biometric token app on the mobile device then converts the data from the image or other data structure to a set of coordinates on a graph representing the biometric input, also referred to herein as biometric coordinates. In one embodiment, where the biometric input is a fingerprint, fingerprint coordinates are generated by a fingerprint coordinate generator such as fingerprint coordinate generator 191. In one embodiment, the fingerprint coordinate generator identifies relative locations of fingerprint characteristics such as crossovers, cores, bifurcations, ridge endings, deltas, pores, loops, or whorls within the fingerprint image, and records coordinates of these characteristics on a graph to form the fingerprint coordinates. In one embodiment, where the biometric input is a retinal image, retinal coordinates are generated by a retinal coordinate generator such as retinal coordinate generator 193. In one embodiment, the retinal coordinate generator identifies relative locations of retina characteristics, such as the positions of branches of blood vessels in the retina of the eye. In one embodiment, where the biometric input is a facial image, facial coordinates are generated by a facial coordinate generator such as facial coordinate generator 195. In one embodiment, the facial coordinate generator identifies relative locations of facial characteristics, such as the positions of eyes, nose, mouth, ears, or other facial features. In one embodiment, the locations of the characteristics (whether fingerprint, retinal, facial, or other) is performed by a machine learning (ML) model trained to accurately identify the locations of such characteristics. Once the biometric coordinates have been generated, they are stored as a data structure for subsequent processing. In one embodiment, multiple types of biometric input are captured and converted to coordinates for added security, for example, both retinal and fingerprint coordinates may be captured.

Once the processor has thus completed accepting the biometric coordinates from a biometric input devices of the mobile device, processing at process block 315 completes, and processing continues to process block 320.

At process block 320, the processor generates the biometric private key from the biometric coordinates by the mobile device.

In one embodiment, a biometric private key generator such as biometric private key generator 197 generates the biometric private key. The biometric coordinates are retrieved from storage. The biometric coordinates are processed to generate a biometric private key from the coordinates. In one embodiment, the biometric coordinates are used as a seed to generate a private key. For example, the entirety of or a portion of one of (i) the binary representation of the biometric coordinates; (ii) the hexadecimal representation of the biometric coordinates, (iii) the ascii string of the biometric coordinates; (iv) the Unicode string of the biometric coordinates; or (v) some other representation of the biometric coordinates are provided as a seed to a key generation module. Key generation module may implement a variety of key generation software, such as HyperCrypt or PuTTY key generators. In one embodiment, the key generation module accepts the seed and returns a public/private key pair where the system is configured to use asymmetric keys as the biometric private key. For example the key generation module may generate the public/private key pair using the Rivest-Shamir-Adleman (RSA) algorithm. Other acceptable asymmetric-key algorithms include Diffie-Hellman, Digital Signature Algorithm (DSA), El Gamal, Elliptic-curve Diffie-Hellman, Elliptic-Curve DSA, and other Elliptic-Curve cryptographic algorithms, Paillier cryptosystem, Cramer-Shoup, and YAK. In one embodiment, the key generation module accepts the seed and returns a private key where the system is configured to use symmetric keys as the biometric private key. For example, the key generation module may generate the private key using the Advanced Encryption Standard (AES) algorithm. Other acceptable symmetric key algorithms may include Blowfish, Camellia, CAST5, ChaCha20, DES, 3DES, Kuznyechik, RC4, Safer, Salsa 20, Serpent, Skipjack, and Twofish. Other methods of using the biometric coordinates to seed generation of a private key are also contemplated by this disclosure. In this way, the biometric private key is generated from one or more of fingerprint biometric coordinates, facial biometric coordinates, and retinal biometric coordinates. The biometric application wraps the newly generated biometric private key in a message for transmission to the requesting entity of the federated identity group. In one embodiment, the message is an X.509 certificate, and the biometric private key is inserted in a field of the certificate, such as the signature field.

Once the processor has thus completed generating the biometric private key from the biometric coordinates by the mobile device, processing at process block 320 completes, and processing continues to END block 325, where process 300 ends.

In one embodiment, the generation of the biometric private key from the biometric coordinates is performed as part of an initial registration process. In one embodiment, the combination of the mobile device and the user's biometric coordinates is registered as a possession factor token for multi-factor authentication, as shown and described herein. In one embodiment, the user attempts a login to access resources of a cloud service provider (such as CSP 1 105). In response to the login attempt, the cloud service provider queries the blockchains (such as blockchains 160) in the cloud service provider's decentralized biometric identity components (such as decentralized biometric identity components 135). In response to finding either (i) that there is no blockchain established for the user-mobile device combination, (ii) that the blockchain established for the user-mobile device combination includes blocks (records) indicating that a prior validation attempt has failed, the cloud service provider redirects the login request to the user registration components (such as user registration components 163) of the federated identity provider (such as federated identity provider 130). to complete a registration process. The user registration components present the user with a prompt to complete a registration process, including downloading and installing a biometric token app (such as biometric token app 127) onto the user's mobile device. Following installation, the user uses the biometric token application to generate the biometric private key for a first time, executing process 300 as part of the initial registration process to authorize the user-mobile device pair as a biometric token device. The biometric token app sends the biometric key (in its X.509 certificate wrapper) to the user registration components.

In one embodiment, the registration of the user continues by submitting the biometric private key for inclusion as an initial record block in the blockchain associated with the user and the mobile device. The user registration components receive the biometric key in a message from the biometric token app, and parse the message to extract the key. The user registration components add the key to an initial or genesis block of a new blockchain specifically for recording multifactor authentication attempts of the user with the mobile device. The user registration components add the new blockchain to the blockchains repository 160 of federated identity provider 130. Federated identity provider propagates the new blockchain to the blockchains repository 160 of all cloud service providers in federated identity group 165.

Example Method for Enforcing Re-Registration of Compromised Identity

FIG. 4 illustrates one embodiment of a method 400 for enforcing re-registration of a compromised user identity associated with provision of decentralized identity with user biometrics. In one embodiment, the steps of method 400 are performed by decentralized biometric identity components 135 and federated identity provider 130 (as shown and described with reference to FIG. 1). In one embodiment, federated identity provider 130 is special purpose computing device (such as computing device 605) configured with decentralized biometric user identity logic 630. In one embodiment, federated identity provider 130 is a module of a special purpose computing device configured with logic 630.

The method 400 may be initiated automatically based on various triggers, such as in response to receiving a signal over a network or parsing stored data indicating that (i) a user (or administrator) of system 100 has initiated method 400, (ii) that method 400 is scheduled to be initiated at defined times or time intervals, (iii) that validation of a biometric private key received from a mobile device as part of a current request to access resources of a cloud computing provider has failed, (iv) that a prior validation of prior biometric private key received from a mobile device as part of a previous request to access resources of a cloud computing provider has failed, or (v) a record (block) of results of a validation included in the blockchain indicates that the validation has failed. The method 400 initiates at START block 405 in response to parsing a signal received or stored data retrieved and determining that the signal or stored data indicates that the method 400 should begin. Processing continues to process block 410.

At process block 410, the processor causes validation of subsequent biometric key submitted following the record to fail.

In one embodiment, during a validation process for a subsequent biometric key executed by validator 155, the cloud service provider accesses the blockchain for the combination of user and mobile device. The cloud service provider parses the blockchain, for example, the latest block of the blockchain, to determine whether any prior attempt to validate a prior biometric key for the user has failed. Where a failed prior attempt to validate a prior biometric key is detected, the validation process for the subsequent biometric key will also fail, even if the subsequent biometric key is a match to the biometric key of the user provided in the genesis block of the blockchain. Validator 155 includes a rule that a validation for a user and mobile device combination fails if any prior validation in the blockchain for that combination of user and mobile device has failed. The intervening failure of validation indicates that they mobile device may have been compromised, indicating a need for re-registration of the user and mobile device combination.

Once the processor has thus completed causing validation of subsequent biometric key submitted following the record to fail, processing at process block 410 completes, and processing continues to process block 415.

At process block 415, the processor requires re-registration of the user to create a new blockchain associated with the user and the mobile device before access to the resources of the cloud service provider will be granted for the user In one embodiment, in response to any attempt to access resources of a cloud service provider in the federated identity group following a failed validation, the cloud service provider will present the user with a message, either (i) generated and presented to the user on a display of the mobile device 125, for example in a GUI of the biometric token app 127, or (ii) generated and presented to the user on a display of computing device 180, for example in a GUI of one or more of the cloud-connected applications 185. The message may indicate, for example, that the mobile device registration has expired, has been canceled, or is otherwise no longer effective, and indicating that the user must re-register the mobile device before access to the resources of the cloud service provider will be permitted. The message may further indicates steps for re-registration, or even include a link to begin a re-registration process.

Once the processor has thus completed requiring re-registration of the user to create a new blockchain associated with the user and the mobile device before access to the resources of the cloud service provider will be granted for the user, processing at process block 415 completes, and processing continues to END block 420, where process 400 ends.

Selected Embodiments

In one embodiment, a computer-implemented method includes in response to a request to access resources of a cloud service provider by a computing device, transmitting a request for a biometric private key to a mobile device associated with a user; in response to receiving the biometric private key, submitting the biometric private key for validation against a blockchain associated with the user and the mobile device; adding a record of the results of the validation to the blockchain; and controlling access to the resources of the cloud service provider based on the record in the blockchain by (i) denying access where the record indicates that validation has failed (ii) granting access where the record indicates that validation has succeeded. In one embodiment, where the blockchain is maintained by each of the cloud service provider and one or more other cloud service providers, the computer-implemented method further includes controlling access to resources of the other cloud resource providers based on the record in the blockchain by (i) denying access to the resources of the other cloud service providers where the record indicates that validation has failed (ii) granting access to the resources of the other cloud service providers where the record indicates that validation has succeeded. In one embodiment of the computer-implemented method, generating the biometric private key includes prompting the user to input his biometric coordinates with the mobile device; accepting the biometric coordinates from a biometric input devices of the mobile device; and generating the biometric private key from the biometric coordinates by the mobile device. In one embodiment, the method further includes registering the user by submitting the biometric private key for inclusion as an initial record block in the blockchain associated with the user and the mobile device. In one embodiment, where the record indicates that validation has failed, the computer-implemented method further includes causing validation of a subsequent biometric key submitted following the record to fail; and requiring re-registration of the user to create a new blockchain associated with the user and the mobile device before access to the resources of the cloud service provider will be granted for the user. In one embodiment of the computer-implemented method, the biometric private key is an Advanced Encryption Standard (AES) or a Rivest-Shamir-Adleman (RSA). In one embodiment of the computer-implemented method, the biometric private key is generated from one or more of fingerprint biometric coordinates, facial biometric coordinates, and retinal biometric coordinates. In one embodiment of the computer-implemented method, the cloud service provider acts as a peer to perform the validation of the biometric private key, add the record of the results to the blockchain maintained within the cloud service provider, and propagate the record to the other cloud service providers for inclusion in copies of the blockchain maintained by the other cloud service providers. In one embodiment of the computer-implemented method, a federated identity provider acts as a peer to perform the validation of the biometric private key, add the record of results to the blockchain maintained within the identity provider and propagate the record to the cloud service provider and the other cloud service providers for inclusion in copies of the blockchain maintained by the cloud service provider and the other cloud service providers. In one embodiment of the computer-implemented method, the blockchain is maintained in a keystore of the cloud service provider. In one embodiment, computer-readable instructions are stored on a non-transitory computer readable medium that, when executed by the processor of a computer in concert with other components of the computer as needed, cause the computer to execute the method. In one embodiment, a computing system including a processor, memory, and a computer readable medium storing computer-readable instructions that, when executed by computing system, cause the computer to execute the method.

Software Module Embodiments

In general, software instructions are designed to be executed by one or more suitably programmed processor accessing memory, such as by accessing CPU or GPU resources. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by a main program for the system, an operating system (OS), or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

Cloud or Enterprise Embodiments

In one embodiment, the present system (such as system 100) includes a computing/data processing system including a computing application or collection of distributed computing applications (such as the providers 105, 110, 130 of federated identity group 165) for access and use by other client computing devices associated with an enterprise (such as the client devices 170, 175, and 180 of enterprise network 120) that communicate with each over a network (such as network 115). The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions.

Mobile Device Embodiment

Figure 5:
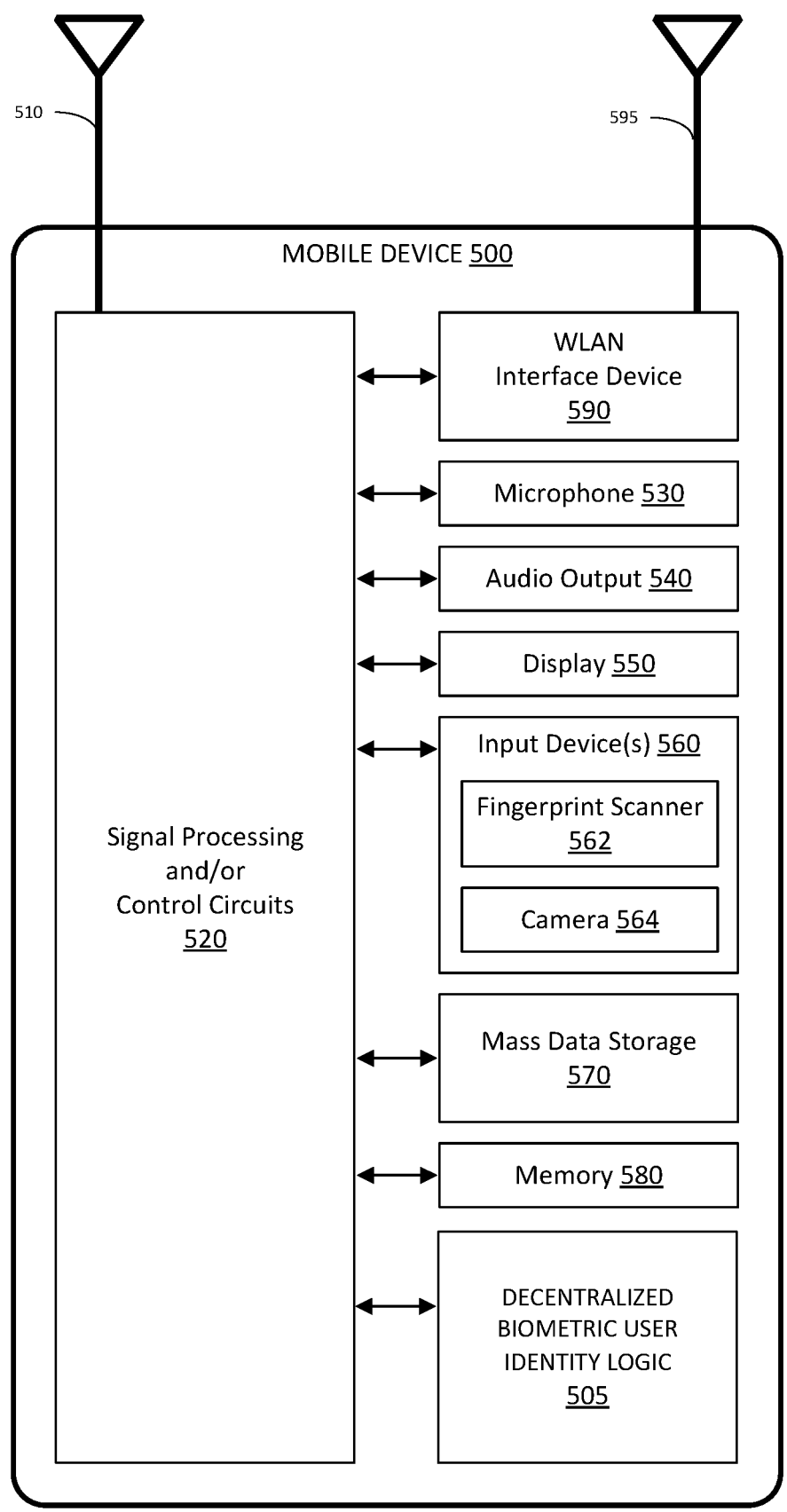
FIG. 5 illustrates an example mobile device that is configured and/or programmed with one or more of the systems and methods associated with provision of decentralized identity with user biometrics described herein, and/or equivalents.

Referring now to FIG. 5, illustrates an example mobile device 500 that is configured and/or programmed with one or more of the systems and methods described herein, and/or equivalents. In one example, the mobile device 500 may include decentralized biometric user identity logic 505 configured to facilitate provision of decentralized identity with user biometrics similar to the logic, system, and methods shown and described with reference to shown in FIGS. 1 through 4. Mobile device 500 may include a cellular antenna 510 to receive or transmit information through a cellular communication network. The example embodiment may implement signal processing and/or control circuits, which are generally identified in FIG. 5 at 520. In some implementations, the mobile device 500 includes a microphone 530, an audio output 540 such as a speaker and/or audio output jack, a display 550 and/or an input device 560 such as a keypad, pointing device, touch screen, voice actuation and/or other input devices. In one embodiment, the input devices 560 also include a fingerprint scanner 562 for accepting a fingerprint, such as an optical fingerprint scanner, a capacitive fingerprint scanner, or an ultrasonic fingerprint scanner. In one embodiment, the input devices 560 also include a camera 564 capable of imaging a retina or imaging a face. In one embodiment, the input devices 560 also include a dedicated retinal scanner (not shown). The signal processing and/or control circuits 520 and/or other circuits (not shown) in the mobile device 500 may process data, perform coding and/or encryption, perform calculations, format data and/or perform other cellular phone functions.

The mobile device 500 may communicate with a mass data storage 570 that stores data in a nonvolatile manner such as in optical and/or magnetic storage devices including, for example, HDDs and/or DVDs. The HDD may be a magnetic HDD having one or more platters, or a solid-state drive (SSD). The mobile device 500 may be connected to a memory 580 such as RAM, ROM, low latency nonvolatile memory such as flash memory and/or other suitable electronic data storage. The mobile device 500 also may support connections with a wireless local area network (WLAN) through a WLAN network interface 590. Mobile device 500 may include a WLAN antenna 595 to receive or transmit information through the WLAN. In this example embodiment, example systems and methods may be implemented using this WLAN network interface 590, but other arrangements are also possible.

Computing Device Embodiments

Figure 6:
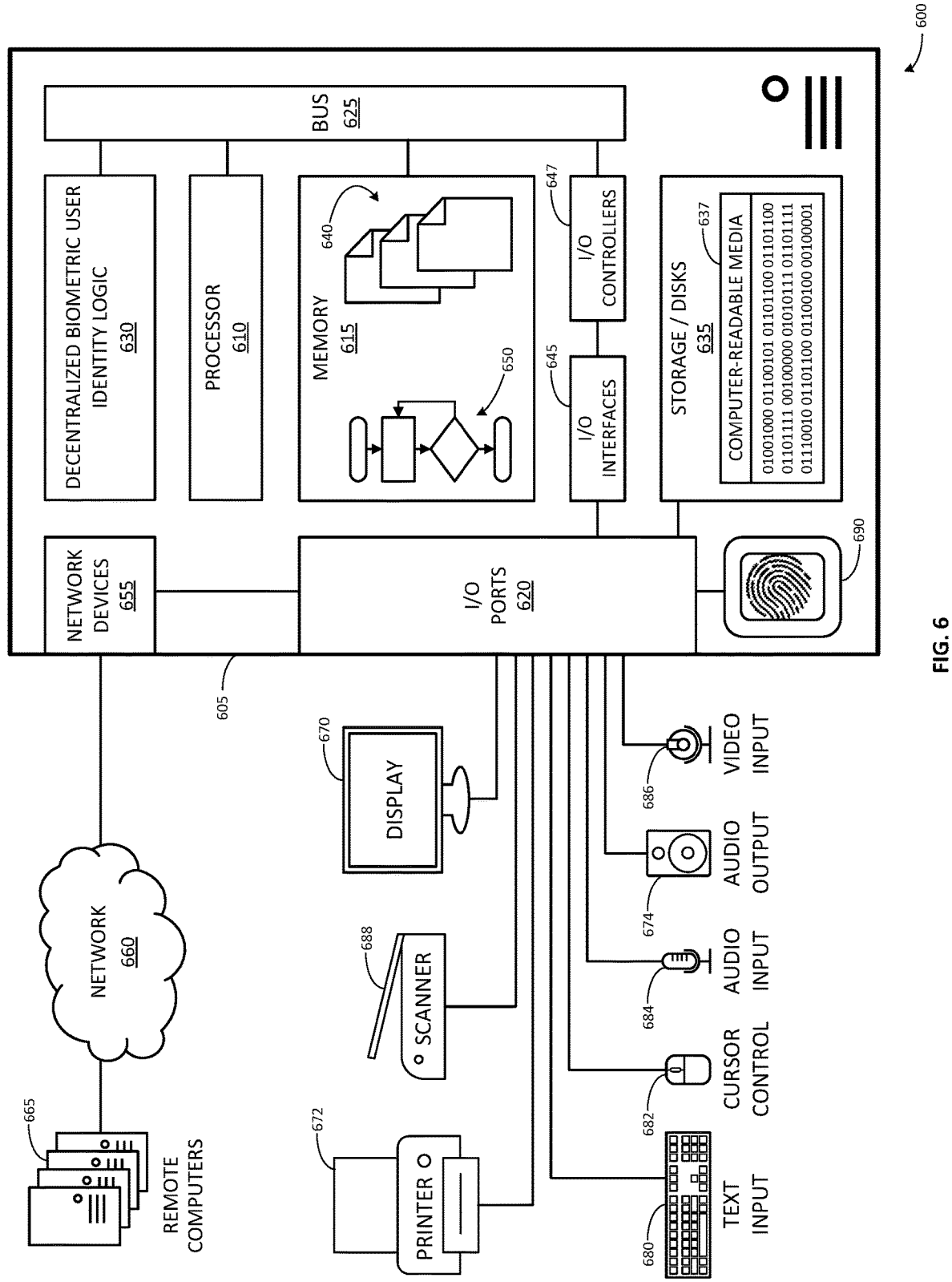
FIG. 6 illustrates an example computing system that is configured and/or programmed as a special purpose computing device with one or more of the example systems and methods associated with provision of decentralized identity with user biometrics described herein, and/or equivalents.

FIG. 6 illustrates an example computing system 600 that is configured and/or programmed as a special purpose computing device with one or more of the example systems and methods described herein, and/or equivalents. The example computing device may be a computer 605 that includes a processor 610, a memory 615, and input/output ports 620 operably connected by a bus 625. In one example, the computer 605 may include decentralized biometric user identity logic 630 configured to facilitate provision of decentralized identity with user biometrics similar to the logic, systems, and methods shown and described with reference to FIGS. 1-4. In different examples, the decentralized biometric user identity logic 630 may be implemented in hardware, a non-transitory computer-readable medium with stored instructions, firmware, and/or combinations thereof. While the decentralized biometric user identity logic 630 is illustrated as a hardware component attached to the bus 625, it is to be appreciated that in other embodiments, the decentralized biometric user identity logic 630 could be implemented in the processor 610, stored in memory 615, or stored in disk 635 on computer-readable media 637.

In one embodiment, decentralized biometric user identity logic 630 or the computing system 600 is a means (such as, structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform provision of decentralized identity with user biometrics as shown and described herein. The means may also be implemented as stored computer executable instructions that are presented to computer 605 as data 640 that are temporarily stored in memory 615 and then executed by processor 610.

Decentralized biometric user identity logic 630 may also provide means (e.g., hardware, non-transitory computer-readable medium that stores executable instructions, firmware) for performing provision of decentralized identity with user biometrics.

Generally describing an example configuration of the computer 605, the processor 610 may be a variety of various processors including dual microprocessor and other multiprocessor architectures. A memory 615 may include volatile memory and/or non-volatile memory. Non-volatile memory may include, for example, ROM, PROM, EPROM, EEPROM, and so on. Volatile memory may include, for example, RAM, SRAM, DRAM, and so on. A storage disk 635 may be operably connected to the computer 605 by way of, for example, an input/output (I/O) interface (for example, a card or device) 645 and an input/output port 620 that are controlled by at least an input/output (I/O) controller 647. The disk 635 may be, for example, a magnetic disk drive, a solid-state disk drive, a floppy disk drive, a tape drive, a Zip drive, a flash memory card, a memory stick, and so on. Furthermore, the disk 635 may be a CD-ROM drive, a CD-R drive, a CD-RW drive, a DVD ROM, and so on. The memory 615 can store a process 650 and/or data 640 formatted as one or more data structures, for example. The disk 635 and/or the memory 615 can store an operating system that controls and allocates resources of the computer 605. The computer 605 may interact with, control, and/or be controlled by input/output (I/O) devices via the input/output (I/O) controller 647, the I/O interfaces 645 and the input/output ports 620. The input/output devices include one or more displays 670, printers 672 (such as inkjet, laser, or 3D printers), and audio output devices 674 (such as speakers or headphones), text input devices 680 (such as keyboards), a pointing and selection device 682 (such as mice, trackballs, touchpads, touch screens, joysticks, pointing sticks, stylus mice), audio input devices 684 (such as microphones), video input devices 686 (such as video and still cameras), video cards (not shown), disk 635, network devices 655, fingerprint scanners 690, internet of things sensors (not shown), and so on. The input/output ports 620 may include, for example, serial ports, parallel ports, and USB ports.

The computer 605 can operate in a network environment and thus may be connected to the network devices 655 via the I/O interfaces 645, and/or the I/O ports 620. Through the network devices 655, the computer 605 may interact with a network 660. Through the network 660, the computer 605 may be logically connected to remote computers 665, remote mobile devices, or remote computer-controllable hardware, such as autonomous vehicles 690. Networks with which the computer 605 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

AES: advanced encryption standard.
API: application programming interface.
ASIC: application specific integrated circuit.
AWS: Amazon Web Services
CA: certifying authority.
CD: compact disk.
CD-R: CD recordable.
CD-RW: CD rewriteable.
CPU: central processing unit.
CSR: certificates signing request.
DVD: digital versatile disk and/or digital video disk.
GPU: graphics processing unit.
HDD: hard disk drive.
HTTP: hypertext transfer protocol.
I/O: input/output.
IAAS: infrastructure-as-a-service.
ICA: intermediate certificate authority.
JKS: Java key store.
JSON: JavaScript object notation.
KMS: key management service.
LAN: local area network.
WLAN: wireless LAN.
MAC: media access control.
MIN: mobile identification number.
ML: machine learning.
NAS: network attached storage.
OCI: Oracle Cloud Infrastructure.
OS: operating system.
PAAS: platform-as-a-service
RAM: random access memory.
DRAM: dynamic RAM.
SRAM: synchronous RAM.
REST: representational state transfer.
ROM: read only memory.
PROM: programmable ROM.
EPROM: erasable PROM.
EEPROM: electrically erasable PROM.
RSA: Rivest-Shamir-Adleman.
SAAS: software-as-a-service.

SOAP: simple object access protocol.
SQL: structured query language.
SSD: solid state drive.
TCP/IP: transmission control protocol/Internet protocol
USB: universal serial bus.
XML: extensible markup language.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

The invention claimed is:

1. A computer-implemented method, comprising:
   in response to a login request associated with a user to access computing resources of a cloud service provider by a computing device,
   (a) retrieving, by the cloud service provider, an identifier of a mobile device associated with the user, from a genesis block of a blockchain of access requests associated with the user, wherein the blockchain is maintained in the cloud service provider, and
   (b) transmitting, by the cloud service provider based on the identifier, a request for a biometric private key to the mobile device associated with the user, wherein the request is configured to cause an application on the mobile device to generate the biometric private key from biometric input by the user at a time of the login request and return the biometric private key to the cloud service provider;
   in response to receiving the biometric private key, submitting the biometric private key as an authentication factor for validation against an initial biometric key from the genesis block of the blockchain of access requests;

adding a record of results of the validation to records stored in the blockchain maintained in the cloud service provider;

propagating the record of results to one or more other cloud service providers for inclusion in the blockchain maintained by the other cloud service providers; and controlling access to the computing resources of the cloud service provider based on the records stored in the blockchain maintained in the cloud service provider by:
(i) denying access to the user via the computing device where the records indicate that a prior attempt to validate a prior biometric key has failed,
(ii) granting access to the user via the computing device where the records indicate that the validation has succeeded and that no prior attempt to validate the prior biometric key has failed, and
wherein, the computing device and the mobile device associated with the user are different devices.

2. The computer-implemented method of claim 1, wherein the blockchain is maintained by the cloud service provider and the one or more other cloud service providers as a distributed ledger of access requests associated with the user and the mobile device.

3. The computer-implemented method of claim 1, further comprising generating the biometric private key by:
prompting the user to input his biometric coordinates using the mobile device;
accepting the biometric coordinates from a biometric input device of the mobile device, wherein the biometric coordinates are coordinates of relative locations of characteristics of a fingerprint, retina, or face on a graph that represents input to the biometric input device; and
generating the biometric private key from the biometric coordinates by the mobile device by using the biometric coordinates to seed generation of the biometric private key.

4. The computer-implemented method of claim 1, further comprising registering the user by submitting the initial biometric key for inclusion in the genesis block of the blockchain of access requests associated with the user.

5. The computer-implemented method of claim 1, wherein the records indicate that validation has failed or that the prior attempt to validate the prior biometric key has failed, further comprising:
causing validation of a subsequent biometric key submitted following the record to fail; and
requiring re-registration of the user to create a new blockchain associated with the user and the mobile device before access to the resources of the cloud service provider will be granted to the user.

6. The computer-implemented method of claim 1, wherein the biometric private key is an Advanced Encryption Standard (AES) key.

7. The computer-implemented method of claim 1, wherein the biometric private key is generated from graph coordinates on an image of one or more of a fingerprint, a face, and a retina.

8. The computer implemented method of claim 1, wherein the validation of the biometric private key is distinct from cryptographic hashing to add blocks to the blockchain.

9. A non-transitory computer-readable medium that includes stored thereon computer-executable instructions that when executed by at least a processor of a computer cause the computer to:

in response to a login request associated with a user to access computing resources of a cloud service provider by a computing device,
(a) retrieve, by the cloud service provider, an identifier of a mobile device associated with the user, from a genesis block of a blockchain of access requests associated with the user, wherein the blockchain is stored in the cloud service provider, and
(b) transmit, by the cloud service provider based on the identifier, a request for a biometric private key to the mobile device associated with the user, wherein the request is configured to cause an application on the mobile device to generate the biometric private key from biometric input by the user at a time of the login request and return the biometric private key to the cloud service provider;

in response to receiving the biometric private key, submit the biometric private key as an authentication factor for validation against an initial biometric key from the genesis block of the blockchain of access requests;
add a record of results of the validation to records stored in the blockchain maintained by the cloud service provider;
propagate the record to one or more other cloud service providers for inclusion in copies of the blockchain maintained by the other cloud service providers; and
control access to the computing resources of the cloud service provider and the other cloud service providers, by the computing device, based on the records stored in the blockchain by:
(i) denying access to the user via the computing device when the records indicates that a prior attempt to validate a prior biometric key has failed,
(ii) granting access to the user via the computing device where the records indicates that the validation has succeeded and that no prior attempts to validate the prior biometric key has failed, and
wherein, the computing device and the mobile device associated with the user are different devices.

10. The non-transitory computer-readable medium of claim 9, wherein the blockchain is maintained by the cloud service provider and the one or more other cloud service providers as a distributed ledger of access requests associated with the user and the mobile device.

11. The non-transitory computer-readable medium of claim 9, wherein the instructions include instructions for registering the user that further cause the computer to:
prompt the user to input his biometric coordinates using the mobile device;
generate the initial biometric key from the biometric coordinates by the mobile device; and
submit the initial biometric key for inclusion as an initial record block in the blockchain associated with the user and the mobile device.

12. The non-transitory computer-readable medium of claim 9, wherein the instructions for generating the biometric private key that further cause the computer to:
prompt the user to input his biometric coordinates using the mobile device;
accept the biometric coordinates from a biometric input device of the mobile device; and
generate the biometric private key from the biometric coordinates by the mobile device.

13. The non-transitory computer-readable medium of claim 9, wherein the records indicate that validation has failed or that a prior attempt to validate a prior biometric key has failed, and wherein the instructions further cause the computer to:

cause validation of a subsequent biometric key submitted following the record to fail; and require re-registration of the user to create a new blockchain associated with the user and the mobile device before access to the resources of the cloud service provider will be granted to the user.

14. The non-transitory computer-readable medium of claim 9, wherein the cloud service provider acts as a peer to perform the validation of the biometric private key against the initial biometric key to determine whether the biometric private key and the initial biometric key match.

15. The non-transitory computer-readable medium of claim 9, wherein a federated identity provider acts as a peer to perform the validation of the biometric private key against the initial biometric key to determine whether the biometric private key and the initial biometric key match.

16. A computing system comprising:

a processor;

a memory operably connected to the processor;

a non-transitory computer-readable medium operably connected to the processor and memory and storing computer-executable instructions that when executed by at least a processor of a computer cause the computing system to:

in response to a login request associated with a user to access computing resources of a cloud service provider by a computing device,
(a) retrieve, by the cloud service provider, an identifier of a mobile device associated with the user, from a genesis block of a blockchain of access requests associated with the user, wherein the blockchain is stored in the cloud service provider, and
(b) transmit, by the cloud service provider using the identifier, a request for a biometric private key to the mobile device associated with the user, wherein the request is configured to cause an application on the mobile device to generate the biometric private key from biometric input by the user at a time of the login request and return the biometric private key to the cloud service provider;

in response to receiving the biometric private key, submit the biometric private key as an authentication factor for validation against an initial biometric key from the genesis block of the blockchain of access requests;

add a record of results of the validation to records stored in the blockchain maintained by the cloud service provider;

propagate the record to one or more other cloud service providers for inclusion in copies of the blockchain maintained by the other cloud service providers and control access to the computing resources of the other cloud service providers based on the records stored in the blockchain by:
(i) denying the user access to the other cloud service providers via the computing device, where the records indicate that a prior attempt to validate a prior biometric key has failed, and
(ii) granting the user access to the other cloud service providers via the computing device, where the records indicate that validation has succeeded and that no prior attempt to validate the prior biometric key has failed;

wherein, the computing device and the mobile device associated with the user are different devices.

17. The computing system of claim 16, wherein the instructions include instructions for registering the user that further cause the computing system to:

prompt the user to input his biometric coordinates using the mobile device;

generate the biometric private key from the biometric coordinates by the mobile device; and submit the biometric private key for inclusion as an initial record block in the blockchain associated with the user and the mobile device.

18. The computing system of claim 16, wherein the instructions include instructions for generating the biometric private key that further cause the computing system to:

prompt the user to input his biometric coordinates using the mobile device;

accept the biometric coordinates from a biometric input device of the mobile device; and generate the biometric private key from the biometric coordinates by the mobile device.

19. The computing system of claim 16, wherein the blockchain is stored in a keystore of the cloud service provider.

* * * * *